United States Patent
Kawahara et al.

(10) Patent No.: US 6,933,067 B2
(45) Date of Patent: Aug. 23, 2005

(54) FUEL CELL

(75) Inventors: Tatsuya Kawahara, Toyota (JP); Katsuhiko Kinoshita, Nisshin (JP); Yoshitaka Kino, Toyota (JP); Toshiaki Ozaki, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 327 days.

(21) Appl. No.: 09/911,731

(22) Filed: Jul. 25, 2001

(65) Prior Publication Data

US 2002/0031696 A1 Mar. 14, 2002

(30) Foreign Application Priority Data

Jul. 25, 2002 (JP) ....................... 2000-223772

(51) Int. Cl.⁷ .................. H01M 8/10; H01M 4/86
(52) U.S. Cl. .................. 429/30; 429/40; 429/42; 429/44
(58) Field of Search .................. 429/40, 42, 44, 429/30

(56) References Cited

U.S. PATENT DOCUMENTS

| | | | |
|---|---|---|---|
| 5,350,643 A | | 9/1994 | Imahashi et al. |
| 5,840,438 A | * | 11/1998 | Johnson et al. ............... 429/30 |
| 6,030,718 A | | 2/2000 | Fuglevand et al. |
| 6,207,312 B1 | | 3/2001 | Wynne et al. |
| 2001/0033960 A1 | * | 10/2001 | Cavalca et al. ............... 429/40 |
| 2003/0082432 A1 | * | 5/2003 | Wilkinson et al. ............... 429/39 |

FOREIGN PATENT DOCUMENTS

| | | |
|---|---|---|
| EP | 0 917 226 | 5/1999 |
| JP | H6-267562 | 9/1994 |
| JP | H8-124583 | 5/1996 |
| JP | H8-167416 | 6/1996 |
| JP | H9-283153 | 10/1997 |
| WO | WO 96/24958 | * 8/1996 |

OTHER PUBLICATIONS

Patent Abstracts of Japan, vol. 1999, No. 11, Sep. 30, 1999 & JP 11 154523 A (Fuji Electric Co Ltd), Jun. 8, 1999.
Patent Abstracts of Japan, vol. 1999, No. 04, Apr. 30, 1999 & JP 11 016590 A (Matsushita Electric IND Co Ltd), Jan. 22, 1999.
Patent Abstracts of Japan, vol. 1999, No. 03, Mar. 31, 1999 & JP 10 326622 A (Matsushita Electric IND Co Ltd), Dec. 8, 1998.

* cited by examiner

*Primary Examiner*—Jonathan Crepeau
(74) *Attorney, Agent, or Firm*—Kenyon & Kenyon

(57) ABSTRACT

A polymer electrolyte fuel cell includes an electrode including a catalyst layer and a diffusion layer. The catalyst layer is divided into a plurality of portions including an upstream portion and a downstream portion along a reactant gas flow direction. The upstream portion of the catalyst layer has a structure for preventing a drying-up of the cell, and the downstream portion of the catalyst layer has a structure for preventing a flooding of the cell. A structure of the diffusion layer also may differ between at the upstream portion and at the downstream portion.

15 Claims, 3 Drawing Sheets

- DRYING-UP PREVENTION CHARACTERISTIC
  ZONE 1>ZONE 2>ZONE 3
- FLOODING PREVENTION CHARACTERISTIC
  ZONE 1<ZONE 2<ZONE 3

FUEL CELL

BACKGROUND OF THE INVENTION

1. Field of the Invention

The present invention relates to a fuel cell. More particularly, the present invention relates to a PEFC (Polymer Electrolyte Fuel Cell) where a drying-up and a flooding of the fuel cell are prevented.

2. Description of Related Art

A PEFC (Polymer Electrolyte Fuel Cell) apparatus includes individual fuel cells. Each fuel cell includes a membrane-electrode assembly (MEA) and a separator. The MEA includes an electrolyte membrane and a pair of electrodes disposed on opposite sides of the electrolyte membrane. The pair of electrodes include an anode provided on one side of the membrane and constructed of a first catalyst layer and a first diffusion layer, and a cathode provided on the other side of the membrane and constructed of a second catalyst layer and a second diffusion layer. The separator has a passage formed therein for supplying fuel gas (hydrogen) to the anode and for supplying oxidant gas (oxygen, usually, air) to the cathode. A plurality of fuel cells are piled to construct a module. A number of modules are piled, and electrical terminals, electrical insulators, and end plates are disposed at opposite ends of the pile of modules to construct a stack of fuel cells. After tightening the stack of fuel cells between the opposite end plates in a fuel cell stacking direction, the end plates are coupled to the fastening member (for example, a tension plate) extending in a fuel cell stacking direction outside the pile of fuel cells by bolts extending perpendicularly to the fuel cell stacking direction.

In the PEFC, at the anode, hydrogen is changed to positively charged hydrogen ions (i.e., protons) and electrons. The hydrogen ions move through the electrolyte to the cathode where the hydrogen ions react with oxygen supplied and electrons (which are generated at an anode of the adjacent MEA and move to the cathode of the instant MEA through a separator) to form water as follows:

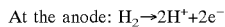
At the anode: $H_2 \rightarrow 2H^+ + 2e^-$

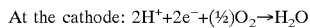
At the cathode: $2H^+ + 2e^- + (\frac{1}{2})O_2 \rightarrow H_2O$

In order that the hydrogen ions move through the electrolyte, the electrolyte membrane has to be aqueous. If the concentration of water in the electrolyte membrane decreases, the electric resistance of the electrolyte membrane increases, resulting in a decrease in an output voltage and a decrease in an output power. If the electrolyte membrane dries out too much, it cannot operate as an electrolyte.

Usually, the composition and the structure of the MEA are uniform in a cell plane. However, a gas concentration and a flow amount of the reactant gas and a partial pressure of the water vapor differ greatly between an upstream side and a downstream side in the reactant gas flow direction. As a result, a drying-up (drying-out) is apt to occur at the upstream side, and a flooding is apt to occur at the downstream side. Accordingly, it is difficult to cause the entire area of the fuel cell to operate stably. The drying-up will cause a decrease in the aqueous concentration of the electrolyte membrane, and the flooding will cause an insufficiency of gas supply and will reduce the performance of the cell.

Japanese Patent Publication No. HEI 6-267562 discloses a fuel cell where the structure of the diffusion layer of the electrode of the fuel cell varies in the gas flow direction so that a product water is easily removed and a flooding is suppressed.

However, the flooding prevention structure is applied to the diffusion layer only in the fuel cell of Japanese Patent Publication No. HEI 6-267562. The structure of the catalyst layer of the electrode, which is closer to the electrolyte membrane than the diffusion layer, is constant in the cell plane. Therefore, there is a room to further improve the drying-up and flooding prevention characteristic of the cell.

SUMMARY OF THE INVENTION

An object of the present invention is to provide a fuel cell which can further prevent a drying-up of the cell at an upstream portion and a flooding of the cell at a downstream portion along a reactant gas flow direction by modifying a structure of not only the diffusion layer but also the catalyst layer of the electrode.

A fuel cell according to the present invention is of a PEFC-type and includes an electrode including a catalyst layer and a diffusion layer. The catalyst layer is sectioned into a plurality portions including an upstream portion and a downstream portion along a reactant gas flow direction. A structure of the catalyst layer differs between at the upstream portion and at the downstream portion. The upstream portion of the catalyst layer has a structure for preventing a drying-up of the cell. The downstream portion of the catalyst layer has a structure for preventing a flooding of said cell.

The diffusion layer may be sectioned into a plurality portions including an upstream portion and a downstream portion along the reactant gas flow direction. A structure of the diffusion layer differs between at the upstream portion and at the downstream portion. The upstream portion of the diffusion layer has a structure for preventing a drying-up of said cell. The downstream portion of the diffusion layer has a structure for preventing a flooding of said cell.

With the above fuel cell according to the present invention, since the structure of the catalyst layer differs between at the upstream portion and at the downstream portion along the reactant gas flow direction such that a drying-up of the cell is prevented at the upstream portion and a flooding of the cell is prevented at the downstream portion, the electric voltage and the output power of the cell and the power efficiency are increased.

Further, in a case where the structure of the diffusion layer also differs between the upstream portion and the downstream portion, a drying-up prevention characteristic is further improved at the upstream portion and a flooding prevention characteristic is further improved at the downstream portion along the gas flow direction. As a result, the electric voltage and the output power of the cell and the power efficiency are further increased.

BRIEF DESCRIPTION OF THE DRAWINGS

The above and other objects, features, and advantages of the present invention will become more apparent and will be more readily appreciated from the following detailed description of the preferred embodiments of the present invention in conjunction with the accompanying drawings, in which.

DETAILED DESCRIPTION OF THE PREFERRED EMBODIMENTS

Figure 1:
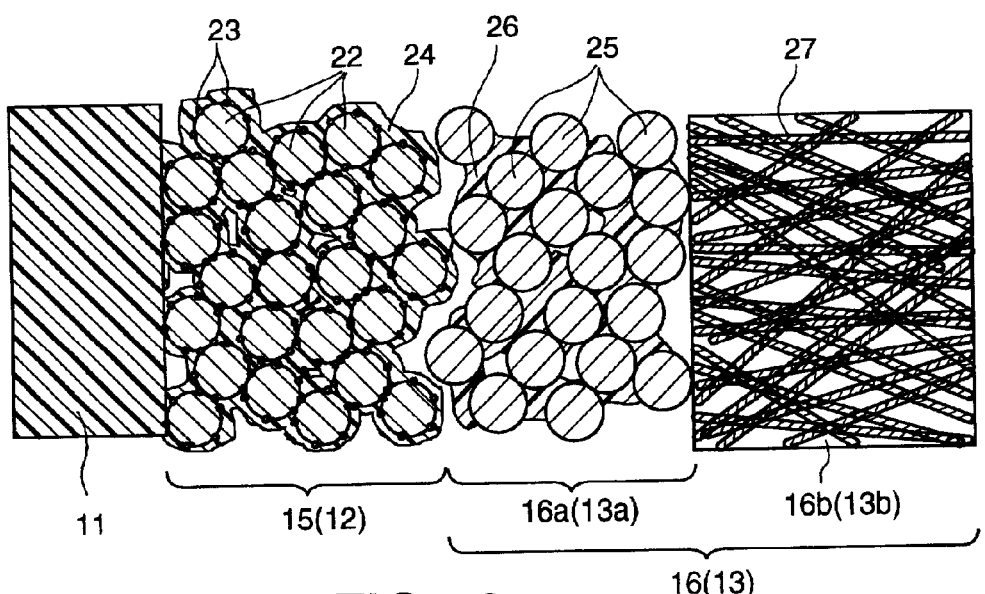
FIG. 1 is a cross-sectional view of a portion of a fuel cell at an upstream portion along a reactant gas flow direction including an electrolyte membrane, a catalyst layer, and a diffusion layer, according to an embodiment of the present invention.
Figure 2:
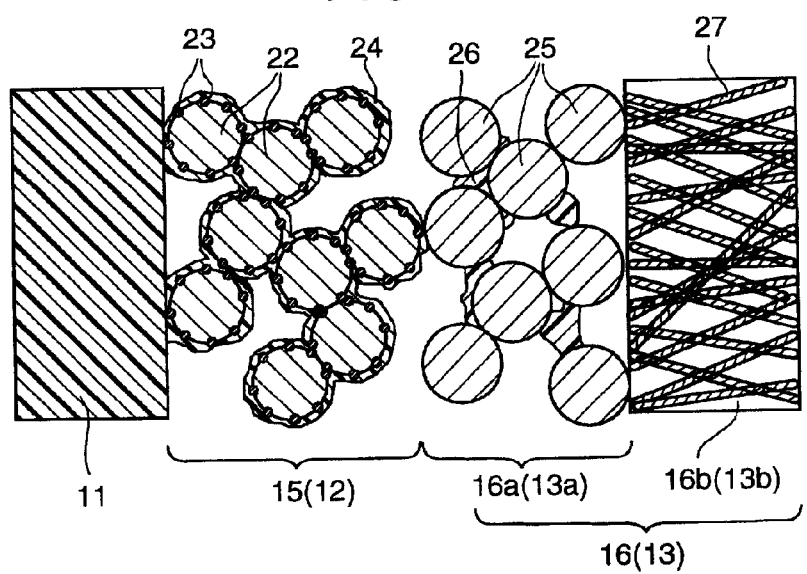
FIG. 2 is a cross-sectional view of a portion of the fuel cell at a downstream portion along the reactant gas flow direction including an electrolyte membrane, a catalyst layer, and a diffusion layer, according to the embodiment of the present invention.

A fuel cell according to the present invention will be explained with reference to FIGS. 1–6. FIGS. 1 and 2 can be applicable to any of a cathode and an anode.

A fuel cell 10 according to the present invention is a polymer electrolyte fuel cell (hereinafter, PEFC) which is mounted to, for example, a vehicle. However, the PEFC 10 may be used for other than a vehicle.

Figure 3:
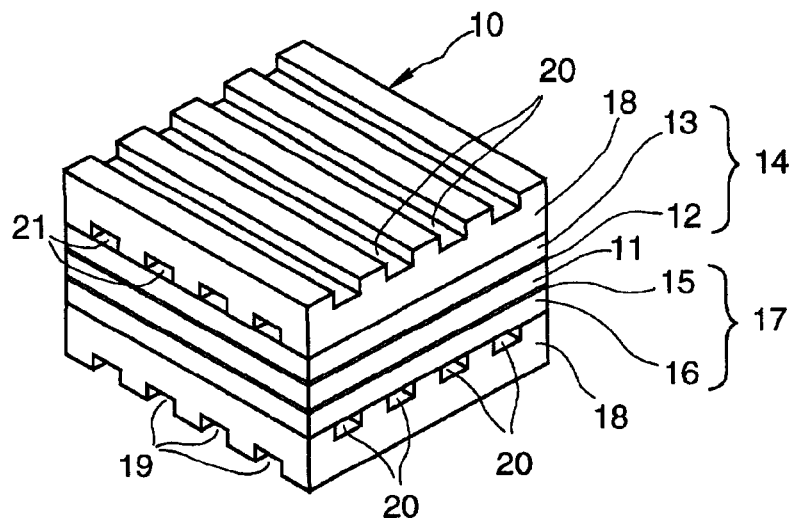
FIG. 3 is an oblique view of the fuel cell according to the embodiment of the present invention.

As illustrated in FIG. 3, the PEFC 10 includes a stack of individual fuel cells 23. Each fuel cell includes a membrane-electrode assembly (MEA) and a separator 18. The MEA includes an electrolyte membrane 11 and a pair of electrodes disposed on opposite sides of the membrane 11. The pair of electrodes include an anode 14 provided on one side of the membrane 11 and constructed of a first catalyst layer 12 and a first diffusion layer 13, and a cathode 17 provided on the other side of the membrane 11 and constructed of a second catalyst layer 15 and a second diffusion layer 16. The separator 18 has a passage formed therein for supplying fuel gas (hydrogen) to the anode 14 and oxidant gas (oxygen, usually, air) to the cathode 17. A plurality of fuel cells are piled, and electrical terminals, electrical insulators, and end plates are disposed at opposite ends of the pile of fuel cells to construct a stack of fuel cells.

In order that the hydrogen ions move through the electrolyte membrane 11, the electrolyte membrane 11 has to be aqueous. The water for making the electrolyte membrane 11 aqueous includes the water added to the reactant gas (hydrogen, air) supplied to the fuel cell 10 by a separate humidifier and the product water produced at the cathode 17.

As illustrated in FIGS. 1 and 2, each catalyst layer 12, 15 includes a carrier of carbon particles 22, a catalyst 23 (for example, Pt), a resin coating layer 24 (constructed of the same resin as the electrolyte membrane 11). The catalyst 23 is carried at the surfaces of the carbon particles 22, and the resin coating layer 24 covers the catalyst 23 and the carbon particles 22. At the cathode 17, the hydrogen ions which have moved through the electrolyte membrane 11 move through the resin coating layer 24 to the catalyst 23 and react with oxygen which has passed through the pores between the carbon particles to conduct the following reaction:

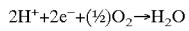

At the anode 14, hydrogen molecules which have passed through the pores between the carbon particles conduct the following reaction at the catalyst:

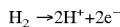

As illustrated in FIGS. 1 and 2, each diffusion layer 13, 16 has a two-layer structure including a water repellent layer 13a, 16a and a substrate layer 13b, 16b. The substrate layer 13b, 16b is disposed closer to the separator than the water repellent layer 13a, 16a. The water repellent layer 13a, 16a includes carbon particles 25 and a resin 26 (fluororesin) connecting a plurality of carbon particles to construct a bridge structure. The substrate layer 13b, 16b includes a cloth of carbon fibers 27. Each of the water repellent layer 13a, 16a and the substrate layer 13b, 16b has a gas permeability and leads the hydrogen and the air flowing in the gas passages formed in the separator to the catalyst layer 12, 15.

In the separator 18, at least one of an oxidant gas passage 20 (an air passage), a fuel gas passage 21 (a hydrogen passage), and a coolant passage 19 (a cooling water passage) is formed. The cooling water passage 19 cools the fuel cell, the temperature of which rises due to the heat generated at the water production reaction and a Joulean heat. A plurality of cells construct a module, and the cooling water passage 19 is formed at all of the modules. The cooling water passage 19 may be a single continuous passage or a plurality of passages independent of each other. An average temperature of the cooling water is at about 80° C. The temperature of the cooling water is at about 75° C. at the inlet and at about 85° C. at the outlet.

The separator 18 operates to separate the hydrogen and the air from each other, to separate the hydrogen and the cooling water from each other, and to separate the air and the cooling water from each other. The separator 18 operates also as an electric current passage between the individual cells connected in series.

The separator 18 is constructed of a carbon plate or an assembly of metal plates on which a ceramic coating may be formed. If the ceramic coating is formed at the entire surface of the metal plates, the ceramic coating has to have an electrical conductivity. If the ceramic coating is formed at the surfaces of the fluid passages only and is not formed at the contact surface with the diffusion layer, the ceramic coating does not need to have an electrical conductivity. Each of the air passage 20, the hydrogen passage 21, and the cooling water passage 19 may be constructed of a groove formed in the separator or a space formed between adjacent separators distanced from each other by protrusions integrally formed to one of the adjacent separators.

In the present invention, the catalyst layer 12, 15 is sectioned into a plurality portions including an upstream portion and a downstream portion along the reactant gas flow direction. A structure of the catalyst layer 12, 15 differs between at the upstream portion and at the downstream portion. The upstream portion of the catalyst layer 12, 15 has a structure for effectively preventing a drying-up of the cell. The downstream portion of the catalyst layer 12, 15 has a structure for effectively preventing a flooding of the cell.

Figure 4:
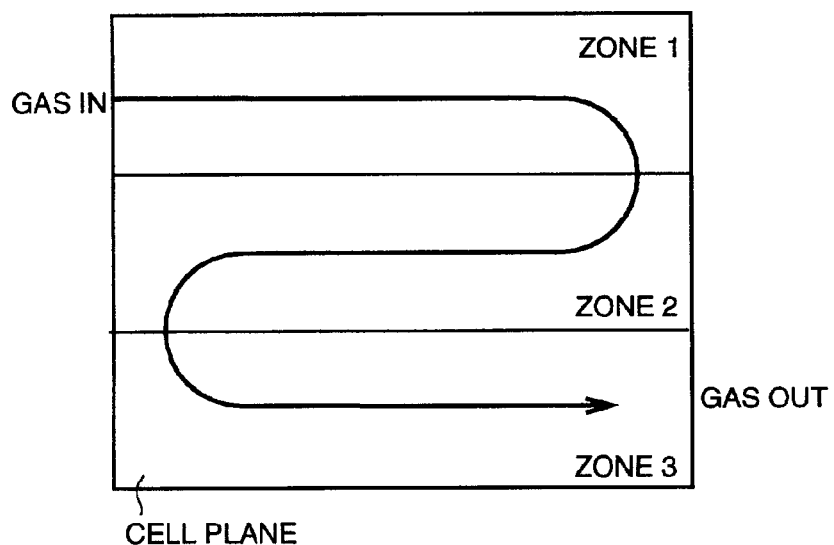
FIG. 4 is a front elevational view of a cell plane of the fuel cell sectioned into a plurality of zones along the gas flow direction according to the embodiment of the present invention.

As illustrated in FIG. 4, the structure of the catalyst layer 12, 15 varies gradually or in a step-wise manner along the reactant gas flow direction. The structure of the catalyst layer 12, 15 may vary gradually in each zone or may be constant in each zone and vary in a step-wise manner at the zone changing point.

For example, in FIG. 4, the cell plane is sectioned into three zones including zone 1 (upstream portion), zone 2 (intermediate portion), and zone 3 (downstream portion) along the gas flow direction. With respect to the drying-up prevention characteristic, zone 1 is more resistant to drying-up than zone 2, and zone 2 is more resistant to drying-up than zone 3. With respect to the flooding prevention characteristic, zone 3 is more resistant to flooding than zone 2, and zone 2 is more resistant to flooding than zone 1.

Parameters for controlling the drying-up characteristic and the flooding characteristic of the catalyst layer 12, 15 include: the concentration of the same resin as the electrolyte, a pore size, a pore amount, and thickness. Parameters for controlling the drying-up characteristic and the flooding characteristic of the diffusion layer 13, 16 include: a pore size, a pore amount, a hydrophobicity, and thickness.

The structure of the catalyst layer 12, 15 for effectively preventing a drying-up of the cell at the upstream portion includes any one of or any combination of the following (1)–(4) structures:

(1) A structure that the catalyst layer 12, 15 includes a coating of the same resin as an electrolyte 11 as one of components of the catalyst layer and that a ratio in amount of the same resin as the electrolyte to all of the components (carbon particles 22 as a carrier, a catalyst 23, and the coating of the resin 24) of the catalyst layer is larger at the upstream portion than at any other portion of the catalyst layer. Since the resin 24 is wet, by increasing the ratio of the resin to all of the components of the catalyst layer, the catalyst layer is unlikely to dry.

(2) A structure that the catalyst layer 12, 15 includes pores between carbon particles and that a pore size (average size) of the catalyst layer is smaller at the upstream portion than at any other portion of the catalyst layer. By this structure, a water vapor is prevented from escaping through the pores. Since hydrogen and oxygen are abundant, the amount of hydrogen and oxygen flowing through the pores to the catalyst is sufficient.

(3) A structure that the catalyst layer 12, 15 includes pores and that a pore amount (a volume of pores) of the catalyst layer 12, 15 is smaller at the upstream portion than at any other portion of the catalyst layer. By this structure, a water vapor is prevented from escaping through the pores. Since hydrogen and oxygen are abundant, the amount of hydrogen and oxygen flowing through the pores to the catalyst is sufficient.

(4) A structure that a thickness of the catalyst layer 12, 15 is greater at the upstream portion than at any other portion of the catalyst layer. By this structure, a water vapor is prevented from escaping through the catalyst layer 12, 15.

The structure of the diffusion layer 13, 16 (especially, the water repellent layer 13a, 16a) for effectively preventing a drying-up of the cell at the upstream portion includes any one of or any combination of the following (1)–(4) structures:

(1) A structure that the diffusion layer 13, 16 includes pores and that a pore size of the diffusion layer 13, 16 is smaller at the upstream portion than at any other portion of the diffusion layer. By this structure, a water vapor is prevented from escaping through the pores. Since hydrogen and oxygen are abundant, the amount of hydrogen and oxygen flowing through the pores to the catalyst is sufficient.

(2) A structure that the diffusion layer 13, 16 includes pores and that a pore amount (a volume of pores) of the diffusion layer 13, 16 is smaller at the upstream portion than at any other portion of the diffusion layer. By this structure, a water vapor is prevented from escaping through the pores. Since hydrogen and oxygen are abundant, the amount of hydrogen and oxygen flowing through the pores to the catalyst is sufficient.

(3) A structure that the diffusion layer 13, 16 has a water repellent layer 13a, 16a and a substrate layer 13b, 16b and that a hydrophobicity of the water repellent layer 13a, 16a of the diffusion layer 13, 16 is stronger at the upstream portion than at any other portion of the diffusion layer. By this structure, a water is prevented from escaping through the diffusion layer 13, 16.

(4) A structure that a thickness of the diffusion layer 13, 16 is greater at the upstream portion than at any other portion of the diffusion layer. By this structure, a water is prevented from escaping through the diffusion layer 13, 16.

As a way to reduce the pore size of the catalyst layer 12, 15, a diameter of an average size of carbon particle 22 may be reduced. More particularly, the diameter of the carbon particle 22 is reduced from 30 nanometers (of the conventional one) to about 10 nanometers.

As a way to reduce the pore amount of the catalyst layer 12, 15, a size of an average size of a bridge structure of carbon particles 22 may be reduced by conducting a high pressure pressing.

As a way to increase the thickness of the catalyst layer 12, 15, a coating thickness may be controlled.

As a way to reduce the pore size of the diffusion layer 13, 16, a diameter of an average size of carbon particle 25 of the water repellent layer 13a, 16a may be reduced.

As a way to reduce the pore amount of the diffusion layer 13, 16, a size of an average size of a bridge structure of carbon particles 25 may be reduced, and/or a thickness of the water repellent layer 13a, 16a may be increased.

As a way to strengthen the hydrophobicity of the diffusion layer 13, 16 at the upstream portion, any one of or any combination of the following ways may be adopted:

(a) a ratio in amount of the fluororesin to all of the components of the water repellent layer 13a, 16a is larger at the upstream portion than at any other portion of the diffusion layer, (b) a hydrophobicity of the carbon of the water repellent layer is strengthened (changing the carbon to a graphite) at the upstream portion, and (c) a hydrophobicity strengthening procedure is applied to said substrate layer 13b, 16b of the diffusion layer at the upstream portion.

To increase the thickness of the diffusion layer 13, 16, a thickness of the substrate layer 13b, 16b may be increased.

A structure for improving a flood prevention characteristic of the catalyst layer and the diffusion layer is in a reverse relationship with the above structure for improving a drying-up prevention characteristic of the catalyst layer and the diffusion layer.

The structure of the catalyst layer 12, 15 for preventing a flooding of the cell at the downstream portion includes any one of or any combination of the following (1)–(4) structures:

(1) A structure that the catalyst layer 12, 15 includes a coating of the same resin 24 as the electrolyte 11 as one of components of the catalyst layer and that a ratio in amount of the same resin 24 as the electrolyte to all of the components (carbon particles 22 as a carrier, a catalyst 23, and the coating of the resin 24) of the catalyst layer is smaller at the downstream portion than at any other portion of the catalyst layer. By reducing the amount of the wet resin 24, the reactant gas is likely to enter the catalyst layer and a flooding is unlikely to occur.

(2) A structure that the catalyst layer 12, 15 includes pores and that a pore size of the catalyst layer is larger at the downstream portion than at any other portion of the catalyst layer. By this structure, gas (hydrogen or air) is likely enter the catalyst layer, and blockage of the pores by water is unlikely to occur.

(3) A structure that the catalyst layer 12, 15 includes pores and that a pore amount of the catalyst layer is larger at the downstream portion than at any other portion of the catalyst layer. By this structure, gas (hydrogen or air) is likely to enter the catalyst layer, and blockage of the pores by water is unlikely to occur.

(4) A structure that a thickness of the catalyst layer 12, 15 is smaller at the downstream portion than at any other portion of the catalyst layer. By this structure, gas (hydrogen or air) is likely to enter the catalyst layer.

The structure of the diffusion layer 13, 16 (especially, the water repellent layer 13a, 16a) for preventing a flooding of the cell at the downstream portion includes any one of or any combination of the following (1)–(4) structures:

(1) A structure that the diffusion layer 13, 16 includes pores and that a pore size of the diffusion layer is larger at the downstream portion than at any other portion of the diffusion layer. By this structure, a water vapor is likely to escape through the pores so that blockage of the pores by a water drop is prevented, and gas (hydrogen or air) is likely to enter the diffusion layer.

(2) A structure that the diffusion layer 13, 16 includes pores and that a pore amount (a volume of the pores) of the diffusion layer is larger at the downstream portion than at any other portion of the diffusion layer. By this structure, gas (hydrogen or air) is likely to enter the diffusion layer.

(3) A structure that the diffusion layer 13, 16 has the water repellent layer 13a, 16a and the substrate layer 13b, 16b and that a hydrophobicity of the water repellent layer 13a, 16a of the diffusion layer 13, 16 is weaker at the downstream portion than at any other portion of the diffusion layer. By this structure, water is likely to go out through the diffusion layer 13, 16.

(4) A structure that a thickness of the diffusion layer 13, 16 is smaller at the downstream portion than at any other portion of the diffusion layer. By this structure, water is likely to go out through the diffusion layer 13, 16, and gas is likely to enter.

As a way to increase the pore size of the catalyst layer 12, 15, a diameter of an average size of carbon particle 22 may be increased. More particularly, the diameter of the carbon particle 22 is increased from 30 nanometers (of the conventional one) to about 50 nanometers.

As a way to increase the pore amount of the catalyst layer 12, 15, a size of an average size of a bridge structure of carbon particles 22 may be increased by conducting a low pressure pressing.

As a way to decrease the thickness of the catalyst layer 12, 15, a coating thickness may be controlled.

As a way to increase the pore size of the diffusion layer 13, 16, a diameter of an average size of carbon particle 25 of the water repellent layer 13a, 16a may be increased.

As a way to increase the pore amount of the diffusion layer 13, 16, a size of an average size of a bridge structure of carbon particles 25 may be increased, and/or a thickness of the water repellent layer 13a, 16a may be decreased.

As a way to weaken the hydrophobicity of the water repellent layer of said diffusion layer 13, 16 at the downstream portion, at least one of the following structures may be adopted:

(a) a ratio in amount of the fluororesin to all of the components of the water repellent layer 13a, 16a is smaller at the downstream portion than at any other portion of the diffusion layer, (b) a hydrophilicity of carbon of the water repellent layer is stronger at the downstream portion than at any other portion of the diffusion layer, and (c) a hydrophilic procedure is applied to the substrate layer 13b, 16b of the diffusion layer at the downstream portion.

If the thickness of the MEA varies due to the above structure, the thickness of the separator should be changed to compensate a change in the thickness of the MEA.

Next, effects of the fuel cell according to the present invention will be explained.

Figure 5:
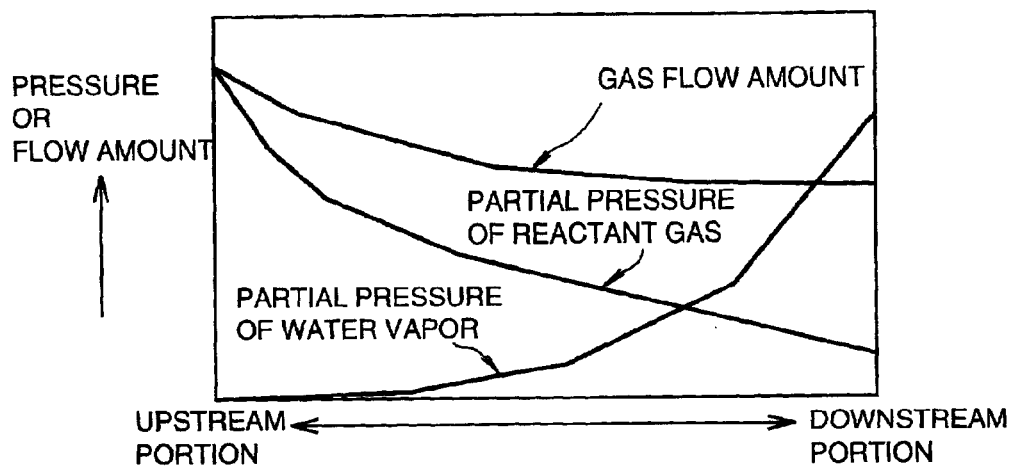
FIG. 5 is a graph illustrating a variance in a gas flow amount, a partial pressure of a reactant gas, and a partial pressure of water vapor along the gas flow direction.

In the usual (conventional) fuel cell, a flow amount and a partial pressure of the reactant gas and a partial pressure of a water vapor have such distributions as illustrated in FIG. 5 along the flow directions. A condition to likely cause a drying-up exists at the upstream portion, and a condition to likely cause a flooding exists at the downstream portion. In order to cause the fuel cell to conduct the power generating reaction stably at the entire plane of the fuel cell, it is preferable to vary the structure of the fuel cell according to those conditions like the present invention.

In the present invention, since the structure (including a composition) of the catalyst layer 12, 15 differs between at the upstream portion and at the downstream portion along the reactant gas flow direction such that the drying-up prevention characteristic of the upstream portion is improved and the flooding prevention characteristic of the downstream portion is improved, a drying-up at the upstream portion and a flooding at the downstream portion are effectively prevented. As a result, a power generating reaction is conducted stably at the entire area of the cell plane.

In a case where the structure of the diffusion layer 13, 16 also differs between at the upstream portion and at the downstream portion along the reactant gas flow direction such that the drying-up prevention characteristic of the upstream portion is improved and the flooding prevention characteristic of the downstream portion is improved, the drying-up at the upstream portion and the flooding at the downstream portion are further prevented, and a power generating reaction is conducted further stably at the entire area of the cell plane.

Figure 6:
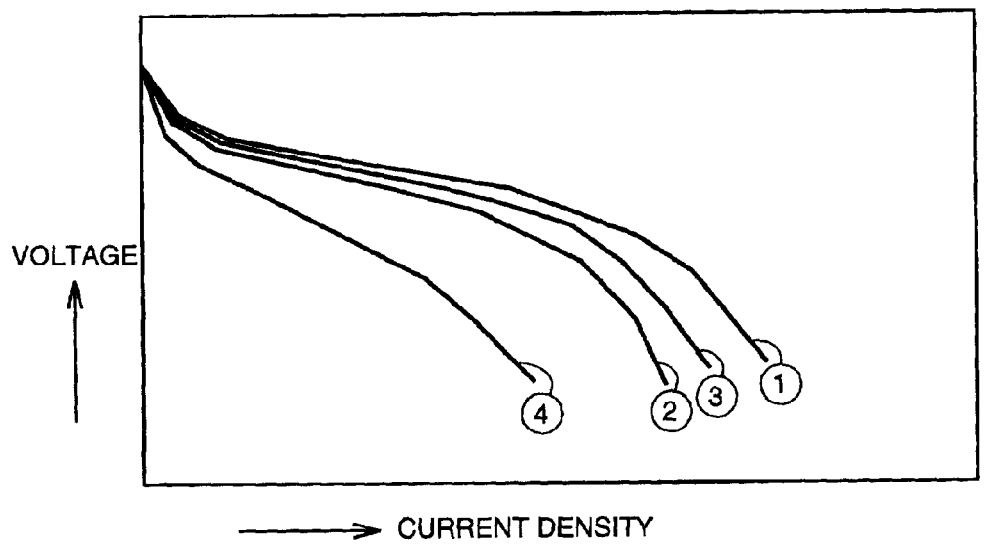
FIG. 6 is a graph of an electric voltage versus an electric current, of a case where the MEA is humidified and a case where the MEA is not humidified, and of the fuel cell according to the embodiment of the present invention and of a conventional fuel cell.

As a result, as illustrated in FIG. 6, in both a case where the MEA is humidified (by a humidifier provided in a supply route of the reactant gas) and a case where the MEA is not humidified, the current density and the electric voltage of the fuel cell increase and the power generating efficiency is improved, compared with those of the conventional fuel cell.

The electric voltage and the current density in the case where the MEA is not humidified, of the fuel cell according to the present invention are substantially equal to the electric voltage and the current density in the case where the MEA is humidified, of the conventional fuel cell. This means that a MEA non-humidifying operation is possible according to the present invention. Of course, the present invention may be applied to a MEA humidifying operation.

The drawings shows that the catalyst layer is provided on one side of the electrolyte membrane, but the catalyst layers may be provided on opposite sides of the electrolyte membrane. By coordinating the design of the upstream portion of one of the hydrogen passage and the air passage to the design of the downstream portion of the other of the hydrogen passage and the air passage, a water balance of the electrolyte membrane is improved.

According to the present invention, the following technical advantages can be obtained:

First, since the structure of the catalyst layer 12, 15 differs between at the upstream portion and at the downstream portion along the reactant gas flow direction, the fuel cell can be constructed such that a drying-up of the cell is prevented at the upstream portion and a flooding of the cell is prevented at the downstream portion. As a result, the electric voltage and the output power of the cell and the power efficiency are increased.

Second, in the case where the structure of the diffusion layer 13, 16 also differs between the upstream portion and the downstream portion, the fuel cell can be constructed such that a drying-up prevention characteristic is further improved at the upstream portion and a flooding prevention characteristic is further improved at the downstream portion along the gas flow direction. As a result, the electric voltage and the output power of the cell and the power efficiency are further increased.

Although the present invention has been described with reference to specific exemplary embodiments, it will be appreciated by those skilled in the art that various modifications and alterations can be made to the particular embodiments shown without materially departing from the novel teachings and advantages of the present invention. Accordingly, it is to be understood that all such modifications and alterations are included within the sprit and scope of the present invention as defined by the following claims.

What is claimed is:

1. A polymer electrolyte fuel cell comprising:

an electrode including a catalyst layer and a diffusion layer, said catalyst layer being sectioned into a plurality of portions including an upstream portion and a downstream portion along a reactant gas flow direction, wherein a structure of said catalyst layer differs between at said upstream portion and at said downstream portion, said upstream portion of said catalyst layer having a structure for preventing a drying-up of said cell, said downstream portion of said catalyst layer having a structure for preventing a flooding of said cell;

wherein said structure of said catalyst layer for preventing a drying-up of said cell at said upstream portion includes each of the following (1)–(4) structures:

(1) said catalyst layer includes a coating of the same resin as an electrolyte as one of components of the catalyst layer, wherein a ratio in amount of the same resin as the electrolyte to all of the components of said catalyst layer is larger at said upstream portion than at any other portion of the catalyst layer;

(2) said catalyst layer includes pores, wherein a pore size of said catalyst layer is smaller at said upstream portion than at any other portion of the catalyst layer;

(3) said catalyst layer includes pores, wherein a pore amount of said catalyst layer is smaller at said upstream portion than at any other portion of the catalyst layer; and (4) a thickness of said catalyst layer is greater at said upstream portion than at any other portion of the catalyst layer;

and wherein said structure of said catalyst layer for preventing a flooding of said cell at said downstream portion includes each of the following (1)–(4) structures:

(1) said catalyst layer includes a coating of the same resin as an electrolyte as one of components of the catalyst layer, wherein a ratio in amount of the same resin as the electrolyte to all of the components of said catalyst layer is smaller at said downstream portion that any other portion of the catalyst layer;

(2) said catalyst layer includes pores, wherein a pore size of said catalyst layer is larger at said downstream portion than at any other portion of the catalyst layer;

(3) said catalyst layer includes pores, wherein a pore amount of said catalyst layer is larger at said downstream portion than at any other portion of the catalyst layer; and (4) a thickness of said catalyst layer is smaller at said downstream portion than at any other portion of the catalyst layer.

2. A fuel cell according to claim 1, wherein said structure of said catalyst layer varies gradually along said reactant gas flow direction.

3. A fuel cell according to claim 1, wherein said structure of said catalyst layer varies in a step-wise manner along said reactant gas flow direction.

4. A fuel cell according to claim 1, said diffusion layer being sectioned into a plurality of portions including an upstream portion and a downstream portion along a reactant gas flow direction, wherein a structure of said diffusion layer differs between at said upstream portion and at said downstream portion, said upstream portion of said diffusion layer having a structure for preventing a drying-up of said cell, said downstream portion of said diffusion layer having a structure for preventing a flooding of said cell.

5. A fuel cell according to claim 4, wherein said structure of said diffusion layer varies gradually along said reactant gas flow direction.

6. A fuel cell according to claim 4, wherein said structure of said diffusion layer varies in a step-wise manner along said reactant gas flow direction.

7. A fuel cell according to claim 4, wherein said structure of said diffusion layer for preventing a drying-up of said cell at said upstream portion includes each of the following (1)–(4) structures:

(1) said diffusion layer includes pores, wherein a pore size of said diffusion layer is smaller at said upstream portion than at any other portion of the diffusion layer;

(2) said diffusion layer includes pores, wherein a pore amount of said diffusion layer is smaller at said upstream portion than at any other portion of the diffusion layer;

(3) said diffusion layer has a water repellent layer and a substrate layer, wherein a hydrophobicity of said water repellent layer of said diffusion layer is stronger at said upstream portion than at any other portion of the diffusion layer; and (4) a thickness of said diffusion layer is greater at said upstream portion than at any other portion of the diffusion layer.

8. A fuel cell according to claim 4, wherein said structure of said diffusion layer for preventing a flooding of said cell at said downstream portion includes each of the following (1)–(4) structures:

(1) said diffusion layer includes pores, wherein a pore size of said diffusion layer is larger at said downstream portion than at any other portion of the diffusion layer;

(2) said diffusion layer includes pores, wherein a pore amount of said diffusion layer is larger at said downstream portion than at any other portion of the diffusion layer;

(3) said diffusion layer has a water repellent layer and a substrate layer, wherein a hydrophobicity of said water repellent layer of said diffusion layer is weaker at said downstream portion than at any other portion of the diffusion layer; and (4) a thickness of said diffusion layer is smaller at said downstream portion than at any other portion of the diffusion layer.

9. A fuel cell according to claim 8, wherein said water repellent layer of said diffusion layer includes a fluororesin and carbon particles as components of said water repellent layer, and wherein in order to weaken the hydrophobicity of said water repellent layer of said diffusion layer at said downstream portion, said diffusion layer includes each of the following (1)–(3) structures:

(1) a ratio in amount of said fluororesin to all of the components of said water repellent layer smaller at said downstream portion than at any other portion of said diffusion layer;

(2) a hydrophilicity of carbon of said water repellent layer stronger at said downstream portion than at any other portion of said diffusion layer; and (3) said substrate layer of said diffusion layer having had a hydrophilic procedure applied at said downstream portion.

10. A polymer electrolyte fuel cell comprising:

an electrode including a catalyst layer and a diffusion layer, said catalyst layer being sectioned into a plurality of portions including an upstream portion and a downstream portion along a reactant gas flow direction, wherein a structure of said catalyst layer differs between at said upstream portion and at said downstream portion, said upstream portion of said catalyst layer having a structure for preventing a drying-up of said cell, said downstream portion of said catalyst layer having a structure for preventing a flooding of said cell;

wherein said structure of said catalyst layer for preventing a drying-up of said cell at said upstream portion includes said catalyst layer comprising a coating of the same resin as an electrolyte as one of components of the catalyst layer, wherein a ratio in amount of the same resin as the electrolyte to all of the components of said catalyst layer is larger at said upstream portion than at any other portion of the catalyst layer;

wherein said structure of said catalyst layer for preventing a flooding of said cell at said downstream portion includes said catalyst layer comprising a coating of the same resin as an electrolyte as one of components of the catalyst layer, wherein a ratio in amount of the same resin as the electrolyte to all of the components of said catalyst layer is smaller at said downstream portion that any other portion of the catalyst layer;

said diffusion layer being sectioned into a plurality of portions including an upstream portion and a downstream portion along a reactant gas flow direction, wherein a structure of said diffusion layer differs between at said upstream portion and at said downstream portion, said upstream portion of said diffusion layer having a structure for preventing a drying-up of said cell, said downstream portion of said diffusion layer having a structure for preventing a flooding of said cell, said diffusion layer having a water repellent layer and a substrate layer; and wherein said structure of said catalyst layer for preventing a drying-up of said cell at said upstream portion includes a thickness of said catalyst layer being greater at said upstream portion than at any other portion of the catalyst layer.

11. The polymer electrolyte fuel cell of claim 10, wherein said structure of said catalyst layer for preventing a drying-up of said cell at said upstream portion includes said catalyst layer comprising pores, a pore size of said catalyst layer being smaller at said upstream portion than at any other portion of the catalyst layer.

12. The polymer electrolyte fuel cell of claim 10, wherein said structure of said catalyst layer for preventing a drying-up of said cell at said upstream portion includes said catalyst layer comprising pores, a pore amount of said catalyst layer being smaller at said upstream portion than at any other portion of the catalyst layer.

13. A polymer electrolyte fuel cell comprising:

an electrode including a catalyst layer and a diffusion layer, said catalyst layer being sectioned into a plurality of portions including an upstream portion and a downstream portion along a reactant gas flow direction, wherein a structure of said catalyst layer differs between at said upstream portion and at said downstream portion, said upstream portion of said catalyst layer having a structure for preventing a drying-up of said cell, said downstream portion of said catalyst layer having a structure for preventing a flooding of said cell;

wherein said structure of said catalyst layer for preventing a drying-up of said cell at said upstream portion includes said catalyst layer comprising a coating of the same resin as an electrolyte as one of components of the catalyst layer, wherein a ratio in amount of the same resin as the electrolyte to all of the components of said catalyst layer is larger at said upstream portion than at any other portion of the catalyst layer;

wherein said structure of said catalyst layer for preventing a flooding of said cell at said downstream portion includes said catalyst layer comprising a coating of the same resin as an electrolyte as one of components of the catalyst layer, wherein a ratio in amount of the same resin as the electrolyte to all of the components of said catalyst layer is smaller at said downstream portion that any other portion of the catalyst layer;

said diffusion layer being sectioned into a plurality of portions including an upstream portion and a downstream portion along a reactant gas flow direction, wherein a structure of said diffusion layer differs between at said upstream portion and at said downstream portion, said upstream portion of said diffusion layer having a structure for preventing a drying-up of said cell, said downstream portion of said diffusion layer having a structure for preventing a flooding of said cell, said diffusion layer having a water repellent layer and a substrate layer; and wherein said structure of said catalyst layer for preventing a flooding of said cell at said downstream portion includes a thickness of said catalyst layer being smaller at said downstream portion than at any other portion of the catalyst layer.

14. The polymer electrolyte fuel cell of claim 13, wherein said structure of said catalyst layer for preventing a flooding of said cell at said downstream portion includes said catalyst layer comprising includes pores, wherein a pore size of said catalyst layer is larger at said downstream portion than at any other portion of the catalyst layer.

15. The polymer electrolyte fuel cell of claim 13, wherein said structure of said catalyst layer for preventing a flooding of said cell at said downstream portion includes said catalyst layer comprising pores, wherein a pore amount of said catalyst layer is larger at said downstream portion than at any other portion of the catalyst layer.

* * * * *